FIG. I.

*INVENTORS.*
WILLIAM F. GHISELIN, JR.
MERLE E. MARTIN,
BY ORVILLE R. SMITH,

*Lyon and Lyon.*
ATTORNEYS.

INVENTORS.
WILLIAM F. GHISELIN, JR.,
MERLE E. MARTIN,
ORVILLE R. SMITH,
BY
Lyon and Lyon
ATTORNEYS.

United States Patent Office 2,964,697
Patented Dec. 13, 1960

2,964,697

WELL LOGGING SYSTEM

William F. Ghiselin, Jr., Merle E. Martin, and Orville R. Smith, Houston, Tex., assignors to Welex, Inc., Fort Worth, Tex., a corporation of Delaware Filed Oct. 10, 1958, Ser. No. 766,441

12 Claims. (Cl. 324—1)

This invention generally relates to logging the electrical characteristics of well formations and more particularly relates to a new and improved system for obtaining such electrical logs.

One type of electrical resistivity measurement of surrounding earth formations is presently made by lowering an energized current electrode having a remote current return into the well bore in conjunction with a selectively spaced potential electrode having a remote potential reference. The volume of formation included in the potential measured is currently considered to be a sphere of radius approximately twice the spacing between the current electrode and the potential electrode. Thus, by provision of increased spacing between the current and the potential electrode, an increased volume of surrounding formation may be taken into consideration. This concept of resistivity measurement is termed a "normal" potential measurement.

Another type of electrical resistivity measurement of the surrounding earth formations is made by lowering an energized current electrode having a remote current return in conjunction with two potential electrodes disposed in spaced apart relation from the current electrode and one another. The potential then measured between the potential electrodes is responsive to the electrical resistivity of a spherical volume of earth currently considered to be of radius approximately the distance between the current electrode and a midpoint between the potential electrodes. By reciprocity of course, the potential electrodes may be provided as current electrodes, the current electrode and remote return then serving as a potential electrode with remote potential reference, to attain this same measurement of resistivity. This concept of measurement is generally termed a "lateral" potential measurement.

The indicated electrical resistivity of the volumes included in these measurements is influenced by diverse conductivity of the drilling fluid and the invasion of the drilling fluid filtrate into the surrounding formations, such influence becoming increasingly predominate as the spacing between the electrodes is reduced. Thus, the potentials measured are not absolutely representative of the true surrounding formation resistivity and are therefore used as an interpretative guide in recognizing shale, brine, oil or other type formations. For this reason it is desired to have measurements taken at varied electrode spacings.

The above mentioned lateral and normal measurements have been found to be complementary in interpretation. The spontaneous potential ("SP") existing between the various points in the well bore and the earth's surface is also a valuable interpretative aid in determining the nature of the surrounding formation. Inclusion of this measurement in the recorded well log is also of valuable assistance in interpretation.

A desirable combination of these measurements as an interpretative aid is two normal measurements taken at varied spacings, two lateral measurements taken at varied spacings, and the SP measurement, all such measurements being concurrently taken at close reference levels established throughout the well bore.

To attain these measurements directly at the earth's surface it is seen that the logging cable provided in connection with a well logging tool to the surface would need many conductors, eventually precluding the possibility of additional measurements due to conductor limitation. Further, since the currents supplied through the current electrodes are preferably alternating to eliminate adverse direct current effects, the coupling effects between the various conductors of a multiple conductor logging cable presents a serious problem in receiving accurate potential indications.

It is accordingly the general object of this invention to provide apparatus with which the SP and plurally spaced apart normal and lateral measurements may be taken and accurately transmitted over a single conductor logging cable to the earth's surface for subsequent concurrent indication and recording.

It is also an object of the present invention to provide apparatus by which the normal and lateral potential measurements may be taken without mutual influence of one to the other.

Briefly described these and other objects of the invention are attained by apparatus including a logging tool body in connection for extension from an electrical logging cable having means to electrically isolate a portion of the cable above the body from surrounding conductive materials. A common current electrode and a lateral current return electrode are disposed in selectively spaced apart relation on the body. The sheath of the cable above the isolating means is adapted to serve as a normal current return electrode. At least one normal potential electrode is disposed in spaced apart relation from the common current electrode and at least one lateral potential electrode is disposed in spaced apart relation from the midpoint between the common current electrode and the lateral current return electrode. A spontaneous potential electrode is disposed on the tool body in spaced apart relation from the common current electrode and has connection through a conductor of the logging cable to receiver and recorder means located at the earth's surface. A means at the earth's surface in connection with the conductor of the logging cable provides a power voltage of desired frequency into the tool body. A first means in connection with the conductor produces a first voltage of different frequency than the power frequency. A second means in connection with the first voltage producing means produces a second voltage of frequency different than the first voltage. A third means in respective connection with the first and second voltage producing means produces a third voltage and a fourth voltage of opposing phase, each of the third and fourth voltages having a first alternation of period shorter than a second alternation. A fourth means in connection with the third voltage producing means produces a fifth voltage having a first alternation of period shorter than the first alternation of the fourth voltage. A voltage rectifying means in connection with the conductor produces a full wave pulsating direct current voltage. A formation voltage supply means is connected with the rectifying means, with the common current electrode and with a switching means. The switching means is connected with the lateral current return electrode and connected with the sheath of the logging cable. A switch driving means is connected with the fourth voltage producing means to produce a sixth and seventh voltage of opposing phase and of frequency corresponding to the termination of the first alternation of the fifth voltage. The driving means is connected with the switching means to respectively effect connection between the formation supply and the lateral current return electrode upon positive alternation of the sixth voltage and effect connection from the formation supply to the sheath upon positive alternation of the seventh voltage. A formation supply shunting means is connected with the third voltage producing means to conduct the direct current from the rectifier means to ground during the fourth voltage first alternation. The formation supply is connected with the first voltage producing means to convert the rectified voltage into an alternating current voltage of the first voltage frequency and connected with the third voltage producing means to be cut off by the fourth voltage first alternation. A first relay means is connected with the normal potential electrode and the driving means to close the circuit betwen the normal potential electrode and a frequency modulated transmitter means during the sixth voltage first alternation and to open the circuit during the sixth voltage second alternation. A second relay means is connected with the lateral potential electrode to close the circuit between the lateral potential electrode and a second frequency modulated transmitter means during the seventh voltage second alternation and to open the circuit during the seventh voltage first alternation. Each of the transmitter means is connected through the cable conductor to the receiver and recorder means which receives and records the signal from each transmitter.

Further objects and advantages of the invention will become apparent from the following description taken in conjunction with the accompanying drawing, in which.

Figure 1:
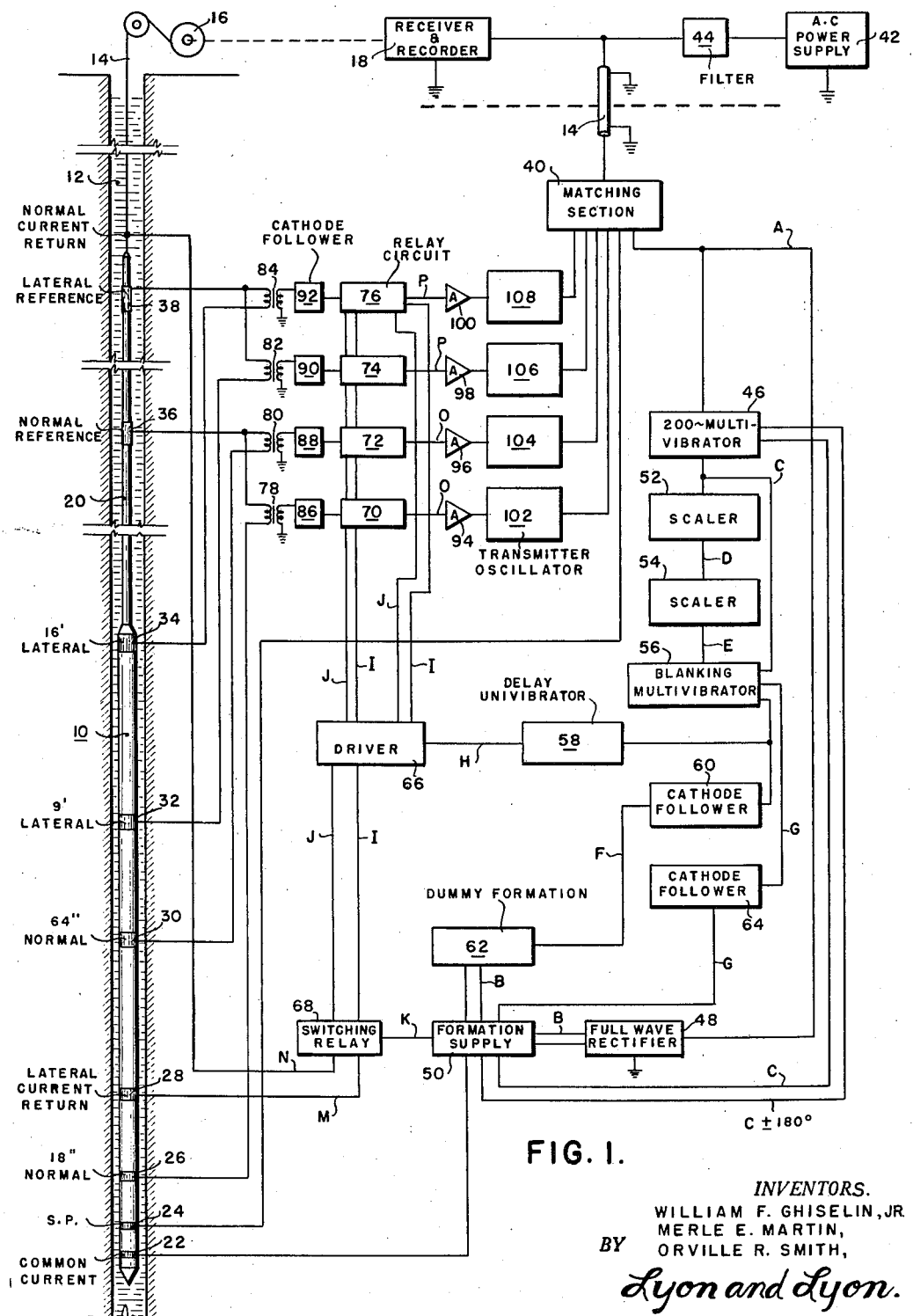
Figure 1 is a schematic representation of a logging system constructed according to the invention.

Now referring to Figure 1, there is illustrated a logging tool 10 suspended in a well bore 12 from a logging cable 14. A hoisting means 16 is provided in connection with cable 14 at the earth's surface to raise and lower tool 10 as required. In responsive connection with hoist 16 is a receiver and recorder means 18, adapted to receive and record the signals received from tool 10.

Connected above tool 10 to electrically isolate a portion of cable 14 from the well fluids is an insulating sheath 20. Mounted on tool 10 in insulated relation to one another and tool 10 are a plurality of current and potential electrodes, each adapted for electrical communication with the conductive drilling fluids and each having electrical connection into tool 10.

Beginning at the bottom of the tool the electrodes shown are a common formation current electrode 22, a spontaneous potential electrode 24, a short spaced normal potential electrode 26, a lateral current electrode 28, a long spaced normal potential electrode 30, a short spaced lateral potential electrode 32, and a long spaced lateral potential electrode 34. Mounted at the upper end of sheath 20 in electrical connection into tool 10 are a normal potential reference electrode 36 and a lateral reference potential electrode 38.

As disclosed, measurements are taken of the potentials created at lateral electrodes 32 and 34 by the flow of electrical current through the surrounding formation between common current electrode 22 and lateral current electrode 28. Measurements are taken of the potentials created at normal electrodes 26 and 30 by the flow of current through the surrounding formation between common current electrode 22 and the grounded sheath of cable 14. Continuous detection is made of the spontaneous potential occurring between electrode 24 and the earth's surface. Illustrated to the right of Figure 1 are the power and detection circuits of the present invention. In actual tools these circuits are contained within tool 10.

Tool 10 may be about 18 feet long and less than 4 inches in diameter. Sheath 20 may extend about 100 feet above tool 10 with reference electrodes 36 and 38 mounted near its upper end. Respective spacings for the various electrodes which are generally accepted by the oil industry are herein given by way of example. The spacing from the common current electrode 22 to the short normal potential electrode 26 may be 18 inches and the spacing from electrode 22 to the long normal potential electrode may be 64 inches. The SP electrode may be positioned about midway between electrodes 22 and 26. The lateral current return electrode 28 may be spaced at 36 inches from common current electrode 22. The short lateral potential electrode 32 may be spaced at 9 feet from the midpoint between current electrodes 22 and 28. The long spaced lateral potential electrode 34 may be spaced at 16 feet from the midpoint between electrodes 22 and 28. Potential reference electrodes 36 and 38 are considered remote.

For illustration, cable 14 is again schematically shown in connection between receiver 18 and a matching section 40 contained within the tool 10. An alternating current power supply 42, at 400 cycles for example, is connected into matching section 40 through a filter 44 and the conductor of cable 14. From matching section 40 the 400 cycle power is used to provide necessary D.C. operating voltages within the tool (not shown) and also is connected in a 200 cycle multivibrator 46 and a full wave rectifier 48. Multivibrator 46 is connected to a formation supply circuit 50, connected through scaler circuits 52 and 54 into a blanking bistable multivibrator 56, and also connected directly into multivibrator 56.

One output of multivibrator 56 is connected to a delay univibrator 58 and through a cathode follower 60 into a dummy formation circuit 62. Another output of multivibrator 56 is connected through a cathode follower 64 into formation supply 50.

The output of univibrator 58 is connected into a bistable multivibrator driving circuit 66. Circuit 66 is connected into a formation switching relay 68 and into gate relay and filtering circuits 70, 72, 74 and 76. One output of relay 68 is connected to the lateral return electrode 28 and another output is connected to the grounded sheath of cable 14. Formation supply circuit 50 is connected into relay 68 and also connected to the common formation current electrode 22.

The short normal potential electrode 26 is connected through the primary of a pickup transformer 78 to the normal reference electrode 36. The long normal electrode 30 is connected through the primary of a pickup transformer 80 to reference electrode 36. The short lateral electrode 32 is connected through the primary of a transformer 82 to lateral reference electrode 38. The long lateral potential electrode 34 is connected through the primary pickup transformer 84 to reference electrode 38.

The secondaries of each of transformers 78, 80, 82 and 84 are respectively connected through cathode follower circuits 86, 88, 90 and 92 into relay and filter circuits 70, 72, 74 and 76. The outputs of relay circuits 70, 72, 74 and 76 are respectively connected through amplifiers 94, 96, 98 and 100 into frequency modulated transmitter oscillators 102, 104, 106 and 108. The modulated outputs of oscillators 102, 104, 106 and 108 are connected through matching section 40 and the conductor of cable 14 into receiver 18. The carrier frequencies of oscillators 102, 104, 106 and 108 may be selected as desired with equal utility in transmission. Example frequencies may be 10.5, 12.3, 14.5 and 22 kc. respectively. For further description of frequency modulated well logging transmission systems, reference may be had to Patent No. 2,573,133 to Greer.

Figure 2:
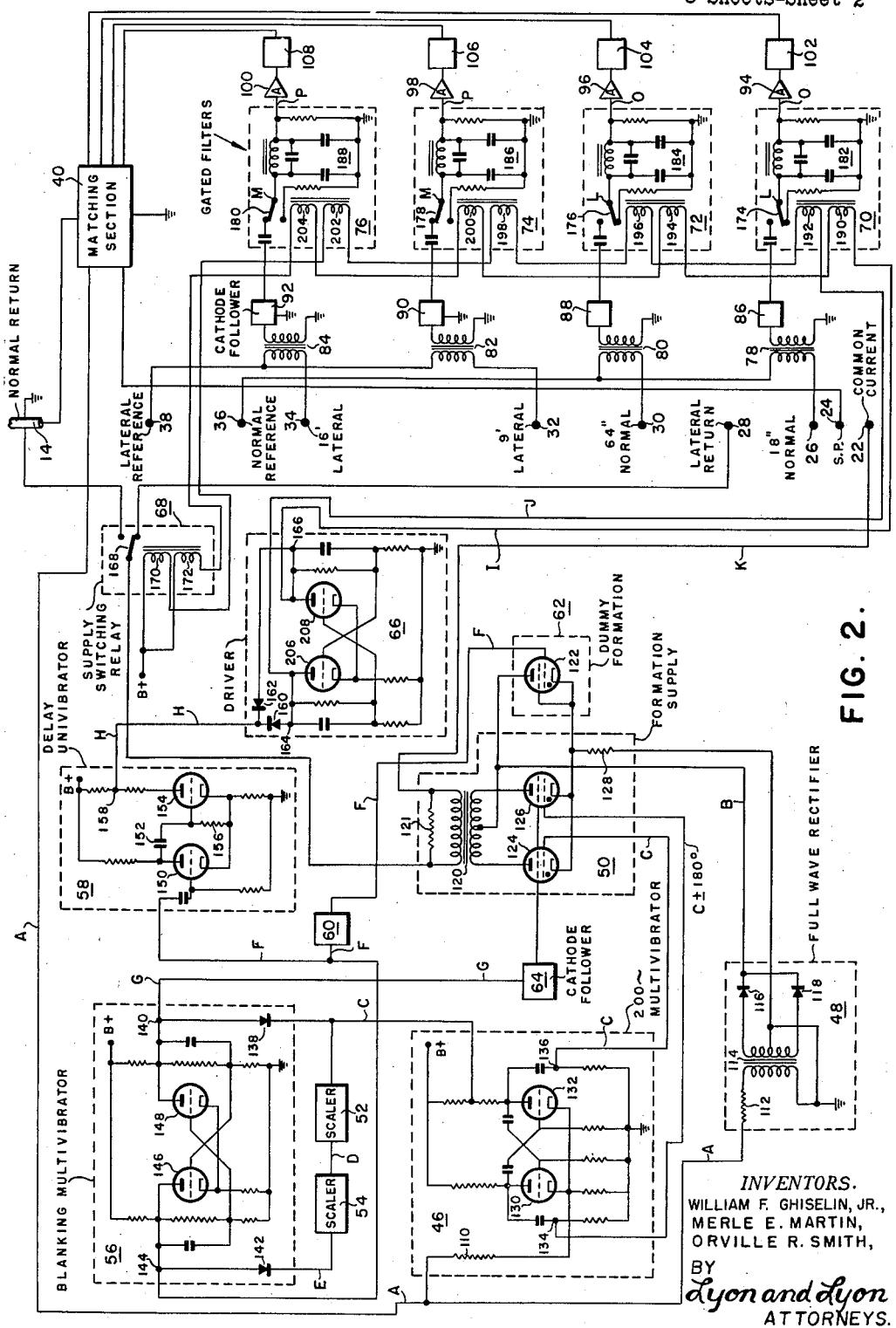
Figure 2 is a more detailed diagram of the circuit of Figure 1.
Figure 3:
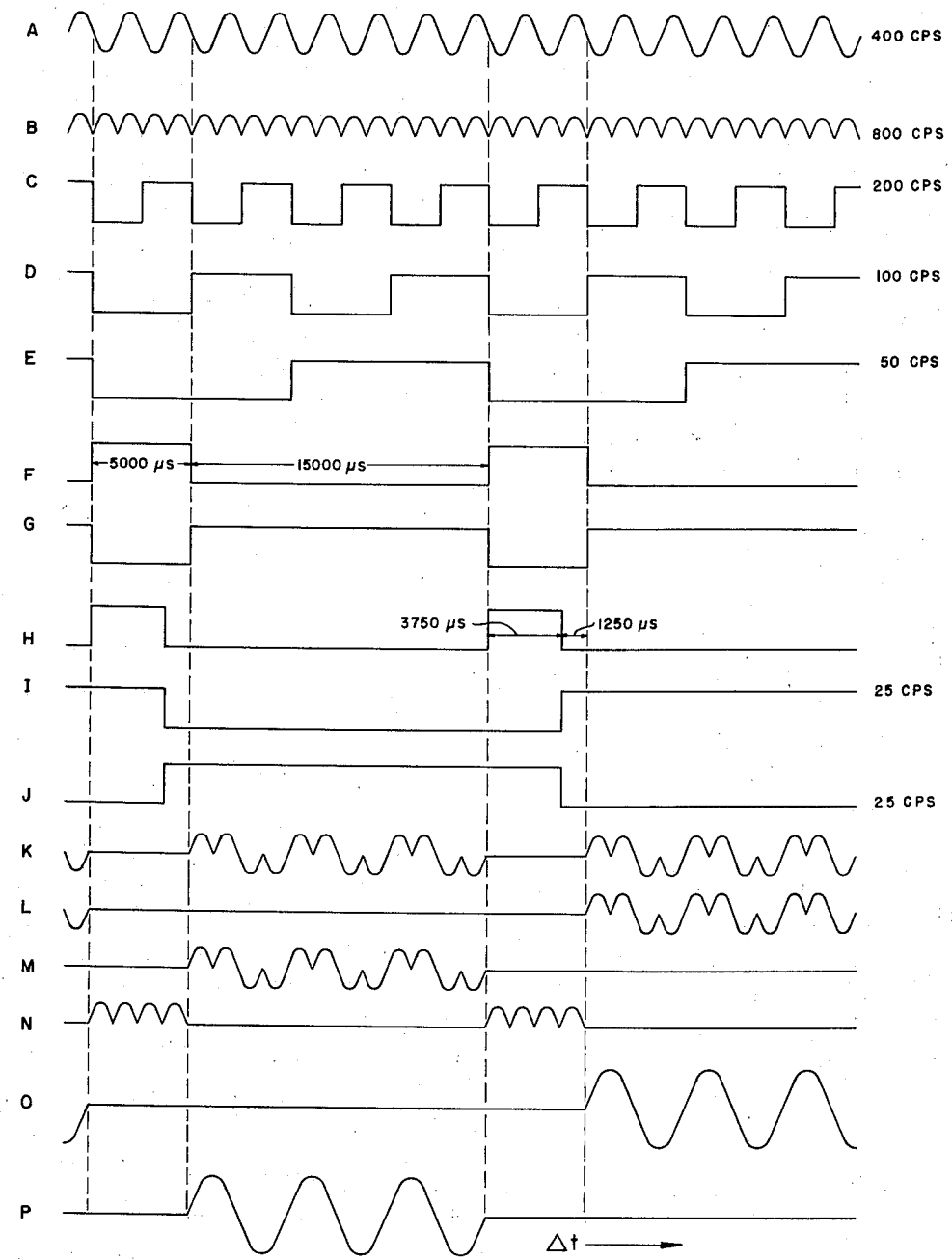
Figure 3 is a graph illustrating the voltage wave forms appearing at various stages of the logging system.

Illustrated in Figure 3 are voltage wave forms A to P which are respectively designated at the various circuit connections of Figure 1 and later shown in Figure 2.

Now referring to Figure 2 in view of Figure 3, a 400 cycle A.C. voltage A is seen in connection from matching section 40 through a voltage dividing resistor 110 to multivibrator 46 and through a load resistor 112 into rectifier 48. From resistor 112 voltage A is connected through the primary of a transformer 114 to ground. The secondary of transformer 114 is center tapped to ground and connected through diodes 116 and 118 into common connection. By virtue of the grounded center tap of the transformer 114 secondary, the common output of diodes of 116 and 118 is an 800 cycle pulsating D.C. voltage B.

Voltage B is connected to a center tap of the primary of transformer 120 and to the plate of a gas filled tetrode 122, contained within the dummy formation 62. The primary of transformer 120 is connected to the plates of gas filled tetrodes 124 and 126. The cathodes of tetrodes 122, 124 and 126 may be commonly connected through a resistor 128 to ground.

The 400 cycle voltage A is connected through resistor 110 to the cathodes of triodes 130 and 132 of multivibrator 46, providing a frequency dividing synchronizing voltage for the multivibrator. Multivibrator 46 is of conventional design and need not be described in detail except to point out that two signal voltages are taken at terminals 134 and 136. A 200 cycle voltage C is taken from terminal 136 to a control grid of formation supply tetrode 124. A 200 cycle voltage at 180° with respect to voltage C is taken from terminal 134 to a control grid of formation supply tetrode 126.

The 200 cycle voltage C is also connected from the plate circuit of triode 132 into scaler 52 and through a diode 138 to a terminal 140 of multivibrator 56. Scaler 52, in response to the 200 cycle voltage C, produces a 100 cycle voltage D which is connected into scaler 54. Scaler 54, in response to the 100 cycle voltage D, produces a 50 cycle voltage E which is connected through a diode 142 to a terminal 144 of multivibrator 56. Multivibrator 56 is a bistable multivibrator of conventional design and need not be described in detail except to point out that a negative alternation of 200 cycle voltage C shuts off a triode 146 and permits current flow through a triode 148. The voltage thereon drops at terminal 140 and rises at terminal 144. This condition remains stable until a negative alternation of the 50 cycle voltage E passes through diode 142 and terminal 144 to the control grid of triode 148. Triode 148 thereon ceases to conduct and triode 146 begins to conduct. The voltage at 144 thereon drops and the voltage at terminal 140 rises. The voltage thus produced at terminal 144 is shown in Figure 3 as wave form F and the voltage created at terminal 140 is shown as wave form G. As later shown, the voltages F and G from multivibrator 56 synchronize the operation of the system.

Voltage F is seen, for example, to have a positive alternation for a first 5000 microsecond period followed by a negative alternation for a second 15,000 microsecond period. Wave form G is seen to concurrently have a negative alternation for the first period and a positive alternation for the second period.

Scalers 52 and 54 each may be bistable multivibrators similar in design to multivibrator 56. When so provided and the negative alternations of a common A.C. voltage are impressed on the control grids of the triodes, the output will be a symmetrical voltage of frequency half that of the input voltage. The voltage E may alternately be provided by a 50 cycle multivibrator similar to multivibrator 46 and synchronized by the voltage C.

Wave form G is taken from terminal 140 and passed through a cathode follower 64 of conventional design to the respective shield grids of formation supply tetrodes 124 and 126. Wave form F is passed through a similar cathode follower 60 to the grid of tetrode 122.

Voltage F is also connected from terminal 144 through a capacitor to a grid of a triode 150 contained in delay univibrator 58. The positive alternation of voltage F appears on the control grid of triode 150 as a short positive pulse, initiating conduction of triode 150. The plate of triode 150 is connected through a capacitor 152 to the control grid of triode 154. The control grid of triode 154 is also connected through a resistor 156 to its cathode. As triode 150 begins to conduct, its plate voltage drops and the grid voltage of triode 154 also drops, causing the triode 154 to cut off. The period in which triode 150 conducts and triode 154 is cut off is determined by the time constant provided by capacitor 152 and resistor 156.

Depending on the time constant established, the cut off period of triode 154 creates a voltage H in its plate circuit at terminal 158. Voltage H, as shown in Figure 3, has a positive alternation beginning concurrently with that of voltage F but having a predetermined less period. The positive period of voltage H may be, for example, about 3750 microseconds. The voltage H taken from the terminal 158 is connected through diodes 160 and 162 to terminals 164 and 166 of driving circuit 66.

When formation supply 50 is provided as described, the 800 cycle pulsating D.C. voltage B appears at the plates of tetrodes 124 and 126. The positive alternations of voltage C appear at the control grids of tetrodes 124 and 126 at alternate 2500 microsecond intervals. Tetrodes 124 and 126 are thus caused to conduct at alternate 2500 microsecond intervals. During the alternate periods of conduction for each triode, the pulsating D.C. voltage B passes through a different side of the primary of transformer 120. The triodes each conduct two alternations of the 800 cycle pulsating voltage B during each period of conduction. Since the 800 cycle voltage B alternately passes through one side of the transformer 120 primary then the other, the voltage appearing across the secondary of the transformer 120 will be a composite voltage of 200 cycle frequency, each alternation being composed of two positive or negative alternations of 800 cycle frequency.

The negative alternation of voltage G appears at the shield grids of tetrodes 124 and 126 at 50 cycle intervals for a duration of 5000 microseconds, cutting off the tetrodes. The positive alternation of voltage F concurrently appears from cathode follower 60, causing tetrode 122 to conduct. Thus, when tetrode 122 is conducting tetrodes 124 and 126 are cut off. The resulting voltage thus created across the secondary of transformer 126 is illustrated as wave form K and the voltage appearing across tetrode 122 is illustrated as wave form N.

One terminal of the secondary of transformer 120 is connected directly to the formation current supply electrode 22. The other terminal of the secondary is connected into a switch 168 of switching relay 68. One terminal of switch 168 is connected to the grounded sheath of cable 14 and another terminal is connected to lateral formation supply current electrode 28. Switch 168 is alternated by voltages of opposite polarity alternately passed through respective coils 170 and 172. A resistor 121 of high resistance value is connected across the secondary of the transformer 120 to reduce any potential across the secondary during the brief open time of the switch 168.

The gate and filter circuits 70, 72, 74 and 76 respectively consist of gate relays 174, 176, 178 and 180 and filter circuits 182, 184, 186 and 188. As shown, relay 174 is provided with driving coils 190 and 192, relay 176 with coils 194 and 196, relay 178 with coils 198 and 200, and relay 180 with coils 202 and 204.

Relay driving circuit 66 is a bistable multivibrator somewhat similar to multivibrator 56 but having, as plate impedances to triodes 206 and 208, the coils of the switching and gate relays 68, 174, 176, 178 and 180. As shown, the plate of triode 206 is connected through coils 192, 196, 198, 202 and 170 to B+. The plate of triode 208 is connected through coils 190, 194, 200, 204 and 172 to B+. Upon each negative alternation of voltage H at terminals 164 and 166, the triodes 206 and 208 alternately conduct. The voltage then appearing at terminal 166 will be the voltage I of Figure 3 and the voltage appearing at the terminal 164 will be the voltage J of Figure 3. When triode 206 is conducting current will flow through coils 192, 196, 198, 202 and 172, causing the relays to be in a first position. Then, when triode 208 alternately conducts, current will flow through coils 190, 194, 200, 204 and 170, causing respective switching of the relays.

As illustrated, when current flows through triode 206 the relays 174 and 176 are held open and the relays 178 and 180 are closed. Relay 68 is switched to a position permitting current flow through the earth formation between electrode 22 and electrode 28. Then, as current flow ceases through triode 206 and begins through triode 208, the switches 174 and 176 close, the relays 178 and 180 open, and the switch 168 alternates to a position permitting current flow through the earth formation from electrode 22 to the sheath of cable 14.

It is pointed out that this switching occurs during the shunting of the formation supply 50 by the dummy formation circuit 62. At such time no current is being provided from transformer 120 and no potentials are being created in the surrounding formation. It is also pointed out that the switching instant during the cut off interval of formation supply 50 is determined by the delay period of univibrator 58. As herein illustrated, the delay period of univibrator may be about 3750 microseconds, providing a remaining period of about 1250 microseconds for the driving circuit 66 to switch relays 68, 174, 176, 178 and 180 before current from formation supply 50 is again impressed through the formation.

It is pointed out that an alternate terminal of each of relays 174, 176, 178 and 180 is connected through a resistor to ground to eliminate noise in filters 182, 184, 186 and 188 during the off cycle of each respective relay. Filters 182, 184, 186 and 188 are typical filters designed to reject harmonics of the 200 cycle frequency shown in Figure 3 as voltages L or M, and to smooth the received voltage to a voltage illustrated in Figure 3 as voltages O and P.

During one period of current flow lateral relays 178 and 180 are closed and switching relay 68 is in position to cause current flow between current electrodes 22 and 28, illustrated as wave form M in Figure 3. At this instance a potential representative of the short spaced lateral is impressed through transformer 82, cathode follower 90 and relay 178 to filter 186. At this concurrent instance a potential representative of a long spaced lateral is picked up from electrode 34 and impressed through transformer 84, cathode follower 92 and relay 180 to filter 188.

The output voltage of filters 186 and 188, shown at P, is then respectively amplified by amplifiers 98 and 100 and fed into transmitter oscillators 106 and 108.

Oscillators 106 and 108 are modulated by these amplified 200 cycle voltages and impress signals of respective carrier frequency through matching section 40 to the conductor of logging cable 14 representative of the lateral potentials occurring at electrodes 32 and 34.

The voltages F and G then cut off formation supply 50 and turn on dummy formation 62. At an interval determined by the delay period of univibrator 58 the negative swing of voltage H switches driving circuit 66. Driving circuit 66 in turn switches the relays into alternate position, closing relays 174 and 176, opening relays 178 and 180, and switching relay 68 to provide current flow through the formation between common current electrode 22 and the sheath of cable 14, illustrated in Figure 3 as wave form L. At such time the potentials occurring at normal electrodes 26 and 30 are respectively impressed through the transformers 78 and 80, cathode followers 86 and 88, relays 174 and 176 into filter circuits 182 and 184. The 200 cycle outputs of filters 182 and 184, shown as voltage O in Figure 3, are then amplified by amplifiers 94 and 96 and fed into transmitter oscillators 102 and 104. The modulated outputs of oscillators 102 and 104 are then impressed through matching section 40 into the conductor of cable 14 as signals representative of the respective normal potential measurements.

The various relays as herein disclosed are of mechanical type, for example such as manufactured by the Bristol Company, Waterbury, Connecticut, under the "Syncroverter" trademark. However, it is pointed out that other types, such as electronic, may be used.

In operation the tool is usually lowered to the bottom of the well bore and a log of the earth formation potentials taken on the upward trip through the well bore. As provided, voltage M is impressed through the formation between lateral current electrodes 22 and 28. At this instance, relay 178 and 180 are closed and oscillators 106 and 108 impress a signal on the conductor of cable 14 representative of the potentials detected at lateral potential electrodes 32 and 34.

Power supply 50 is then shunted for an interval by dummy formation supply 62 and no current flows through the formation. At a predetermined interval before current is again impressed from formation supply 50, relay 68 is switched to permit current flow through the formation between the current electrode 22 and the sheath of cable 14. Such switching concurrently opens relays 178 and 180 and closes relays 174 and 176. Current begins to flow in the formation between electrode 22 and the sheath of cable 14. The potentials occurring at normal potential electrodes 26 and 30 are filtered to voltages illustrated by voltage O of Figure 3, amplified by amplifiers 94 and 96 and fed into transmitter oscillators 102 and 104. Oscillators 102 and 104 impress frequency modulated signals representative of these normal potentials onto the conductor of cable 14.

The spontaneous potential occurring between electrode 24 and the earth's surface is continually impressed through matching section 40 and the conductor of cable 14 to receiver 18 and recorded.

It is to be understood that the embodiment herein disclosed is illustrative only and that alternate embodiments will become apparent to those skilled in this art. The invention is therefore not limited thereby but includes all modifications coming within the definition of the appended claims.

That being claimed is:

1. In earth formation electrical logging system for simultaneously making a spontaneous potential log, at least one lateral resistivity log and at least one normal resistivity log of earth formations traversed by a well bore, comprising, a logging tool body in connection with an electrical logging cable, a common current electrode and a lateral current return electrode disposed in selectively spaced apart relation on said tool body, the sheath of said cable above said body being adapted to serve as a normal current return electrode, at least one normal potential electrode respectively disposed in spaced apart relation from said common current electrode, at least one lateral potential electrode disposed in spaced apart relation from the midpoint between said common current electrode and said lateral current return electrode, a spontaneous potential electrode disposed on said tool body in spaced apart relation from said common current electrode and in connection through a conductor of said logging cable to receiver and recorder means at the earth's surface, a first means for producing a first voltage and a second voltage of opposing phase, each of said first and second voltages having a first alternation of period shorter than a second alternation, a second means initiated by said first voltage producing means for producing a third voltage having a first alternation of period shorter than the first alternation of said third voltage, rectifying means for producing a direct current voltage, a formation voltage supply means in connection with said rectifying means, with said common current electrode and with a switching means, said switching means in connection with said lateral current return electrode and in connection with the sheath of said logging cable, a switch driving means in connection with said switching means for respectively effecting connection between said formation supply and said lateral current return electrode upon one termination of said third voltage alternation and effecting connection from said formation supply to said sheath upon an alternate termination of said third voltage alternation, said formation supply means being in connection with said first voltage producing means to be cut off during said second voltage first alternation, a first relay means in connection with said normal potential electrode and in connection with said driving means for closing the circuit between said normal potential electrode and a frequency modulated transmitter means during connection of said normal current return electrode and for opening the said circuit during its disconnection, a second relay means in connection with said lateral potential electrode for closing the circuit between said lateral potential electrode for closing the circuit between said lateral potential electrode and a second frequency modulated transmitter means during connection of said lateral current return electrode and for opening said circuit during its disconnection, said transmitter means being connected through said cable conductor to said receiver and recorder means to receive and record the signal from each transmitter means.

2. In an earth formation electrical logging system, a logging tool body in connection for extension from an electrical logging cable, a common current electrode, a lateral current return electrode and a normal current return electrode disposed in selectively spaced apart relation with respect to said tool body, means at the earth's surface in connection with said conductor of said logging cable to provide a power voltage of desired frequency into said tool body, a first means in connection with said conductor for producing a first voltage of different frequency than said power frequency, a second means in connection with said first voltage producing means for producing a second voltage of frequency different than said first voltage, a third means in respective connection with said first and second voltage producing means for producing a third voltage and a fourth voltage of opposing phase, each of said third and fourth voltages having a first alternation of period shorter than a second alternation, a fourth means initiated by said third voltage producing means for producing a fifth voltage having a first alternation of period shorter than the first alternation of said fourth voltage, a voltage rectifying means in connection with said conductor for producing a direct current voltage, a formation voltage supply means in connection with said rectifying means, with said common current electrode and with a switching means, said switching means in connection with said lateral current return electrode and in connection with said normal current return electrode, a switch driving means in connection with said fourth voltage producing means for producing a sixth and seventh voltage of opposing phase and of frequency corresponding to the termination of the first alternation of said fifth voltage, said driving means being in connection with said switching means for respectively effecting connection between said formation supply and said lateral current return electrode upon positive alternation of said sixth voltage and effecting connection from said formation supply to said current return electrode upon positive alternation of said seventh voltage, and a formation supply shunting means in connection with said third voltage producing means for conduction of said direct current from said rectifier means to ground during said fourth voltage first alternation, said formation supply in connection with said first voltage producing means to convert said rectified voltage into an alternating current voltage of said first voltage frequency, said formation supply means being in connection to be cut off by said third voltage producing means during said fourth voltage first alternation.

3. In a well logging system, a source of direct current voltage in connection with a center tap of a primary coil of a transformer, a secondary coil of said transformer being connected to a first well logging current electrode and respectively connectable to a second and a third current electrode through a first switching relay, a first and a second current flow control means in connection between the ends of said primary coil and ground, a third current flow control means in connection between said direct current source and ground, a first voltage actuating means in connection with said first and second control means for alternately preventing current flow through each control means, a second voltage actuating means for preventing current flow through both said first and second control means and alternately through said third control means, a third voltage actuating means in connection with said second actuating means and said switching relay for alternately switching the connection with said transformer secondary from said second current electrode to said third current electrode during a period when current is flowing only through said third control means, at least one second switching relay in connection with said third actuating means and a respective potential electrode for connecting said potential electrode to a first potential detection and frequency modulated transmission means during the periods when current is flowing through said first current electrode, and at least one third switching relay in connection with said third actuating means and another respective potential electrode for connecting said other potential electrode to a second potential detection and frequency modulated transmission means during the periods when current is flowing through said second current electrode, and receiving and recording means connected to said transmission means through a single conductor well logging cable.

4. A well logging system comprising, a source of direct current voltage in connection with a formation voltage supply means, a first output of said supply means being connected to a first well logging current electrode and a second supply output being respectively connectable to a second and third current electrode through a first switching relay, a current shunting means in connection between said direct current source and ground, a first voltage actuating means in connection with said supply means for alternating the direction of current flow from said supply means, a second voltage actuating means for preventing current flow through said supply means and alternately through said shunting means, a third voltage actuating means in connection with said second actuating means and said switching relay for alternately switching said second output from said second current electrode to said third current electrode during a period when current is flowing only through said shunting means, at least one second switching relay in connection with said third actuating means and a respective potential electrode for connecting said potential electrode through a first potential detection and frequency modulated transmission means during the periods when current is flowing through said first current electrode, and at least one third switching relay in connection with said third actuating means and another respective potential electrode for connecting said other potential electrode to a second potential detection and frequency modulated transmission means during the periods when current is flowing through said second current electrode.

5. In a well logging system, a source of direct current voltage in connection with a center tap of a primary coil of a transformer, a secondary coil of said transformer being connected to a first well logging current electrode and respectively connected to a second and a third current electrode through a first switching relay, a first and a second current flow control means in respective connection between the ends of said primary coil and ground, a third current flow control means in connection between said direct current source and ground, a first voltage actuating means in connection with said first and second control means for alternately preventing current flow through each control means, and a second voltage actuating means for alternately preventing current flow through both said first and second control means and through said third control means.

6. In a well logging system, a source of direct current voltage in connection with a center tap of a primary coil of a transformer, a secondary coil of said transformer being connected to a first well logging current electrode and respectively connectable to a second and a third current electrode through a first switching relay, a first and a second current flow control means in connection between the ends of said primary coil and ground, a third current flow control means in connection between said direct current source and ground, a first voltage actuating means in connection with said first and second control means for alternately preventing current flow through each control means, a second voltage actuating means for preventing current flow through both said first and second control means and alternately through said third control means, a third voltage actuating means in connection with said second actuating means and said switching relay for alternately switching the connection with said transformer secondary from said second current electrode to said third current electrode during a period when current is flowing only through said third control means, at least one second switching relay in connection with said third actuating means and a respective potential electrode for connecting said potential electrode to a first potential detection and transmission means during the periods when current is flowing through said first current electrode, and at least one third switching relay in connection with said third actuating means and another respective potential electrode for connecting said other potential electrode to a second potential detection and transmission means during the periods when current is flowing through said second current electrode, and receiving and recording means connected to said transmission means through a well logging cable.

7. In a well logging system, a source of direct current voltage in connection with a center tap of a primary coil of a transformer, a secondary coil of said transformer being connected to a first well logging current electrode and respectively connectable to a second and a third current electrode through a first switching relay, a first and a second current flow control means in connection between the ends of said primary coil and ground, a third current flow control means in connection between said direct current source and ground, a first voltage actuating means in connection with said first and second control means for alternately preventing current flow through each control means, a second voltage actuating means for preventing current flow through both said first and second control means and alternately through said third control means, and a third voltage actuating means in connection with said second actuating means and said switching relay for alternately switching the connection with said transformer secondary from said second current electrode to said third current electrode during a period when current is flowing only through said third control means.

8. In a well logging system, a source of direct current voltage in connection with a center tap of a primary coil of a transformer, a secondary coil of said transformer being connected to a first well logging current electrode and respectively connectable to a second and a third current electrode through a first switching relay, a first and a second current flow control means in connection between the ends of said primary coil and ground, a third current flow control means in connection between said direct current source and ground, a first voltage actuating means in connection with said first and second control means for alternately preventing current flow through each control means, a second voltage actuating means for preventing current flow through both said first and second control means and alternately through said third control means, a third voltage actuating means in connection with said second actuating means and said switching relay for alternately switching the connection with said transformer secondary from said second current electrode to said third current electrode during a period when current is flowing only through said third control means, at least one second switching relay in connection with said third actuating means and a respective potential electrode for connecting said potential electrode to a first potential detection and transmission means during the periods when current is flowing through said first current electrode, and at least one third switching relay in connection with said third actuating means and another respective potential eelctrode for connecting said other potential electrode to a second potential detection and transmission means during the periods when current is flowing through said second current electrode.

9. In electrical logging apparatus of the type described, the combination of, a logging tool in connection with an electrical logging cable, a common current electrode and a lateral current electrode disposed in selectively spaced relation on said tool, a normal current electrode disposed in substantially remote relation from said common current electrode, at least one normal potential electrode and one lateral potential electrode disposed in selectively spaced relation to said current electrodes, potential reference electrode means disposed in selectively spaced relation to said potential electrodes, formation current means in connection with said common current electrode and in alternate connection through a formation relay to said lateral current electrode and said normal current electrode for alternately providing a lateral and a normal potential field in surrounding earth formations in response to respective connection of said formation relay, a lateral potential detection and transmission means in connection with said logging cable and in connection through a lateral relay to said lateral potential electrodes for detection of a lateral potential within said lateral potential field and transmission of a representative lateral signal in response to connection of said lateral relay, a normal potential detection and transmission means in connection with said logging cable and in connection through a normal relay to said normal potential electrodes for detection of a normal potential within said normal potential field and transmission of a representative normal signal in response to connection of said normal relay, a formation current shunting means in connection with said formation current means for selectively preventing any earth formation potential field, a relay driving means in connection with said formation relay, said lateral relay, said normal relay and said shunting means for switching said formation relay, closing said lateral relay during existence of said lateral potential field, closing said normal relay during existence of said normal potential field and shunting said formation current during an interval sufficient for actuation of said relays, an alternating current source in connection with said logging cable for providing a power voltage to said formation current means, said relays and said detection and transmission means, and means in connection with said logging cable for providing indication of said lateral and normal signals.

10. In electrical logging apparatus of the type described, the combination of, a logging tool in connection with an electrical logging cable, a common current electrode and a lateral current electrode disposed in selectively spaced relation on said tool, a normal current electrode disposed in substantially remote relation from said common current electrode, at least one normal potential electrode and one lateral potential electrode disposed in selectively spaced relation to said current electrodes, potential reference electrode means disposed in selectively spaced relation to said potential electrodes, formation current means in connection with said common current electrode and in alternate connection through a formation relay to said lateral current electrode and said normal current electrode for alternately providing a lateral and a normal potential field in surrounding earth formations in response to respective connection of said formation relay, a lateral potential detection means in connection with said logging cable and in connection through a lateral relay to said lateral potential electrodes for detecting a lateral potential within said lateral potential field and placing a representative lateral signal on said logging cable in response to connection of said lateral relay, a normal potential detection means in connection with said logging cable and in connection through a normal relay to said normal potential electrodes for detecting a normal potential within said normal potential within said normal potential field and placing a representative normal signal on said logging cable in response to connection of said normal relay, a relay driving means in connection with said formation relay, said lateral relay, and said normal relay for switching said formation relay, closing said lateral relay during existence of the lateral potential field and closing said normal relay during existence of said normal potential field and means in connection with said logging cable for providing power voltage to said relay driving means, formation current means, said relays and said detection means.

11. In electrical logging apparatus of the type described, the combination of, a logging tool in connection with an electrical logging cable, a common current electrode and a lateral current electrode disposed in selectively spaced relation on said tool, a normal current electrode disposed in substantially remote relation from said common current electrode, formation current means in connection with said common current electrode and in alternate connection through a formation relay means to said lateral current electrode and said normal current electrode for alternately providing a lateral and a normal potential field in surrounding earth formations in response to respective connection of said formation relay, a potential detection and transmission means in connection with said logging cable and in connection through relay means to potential electrodes for detection of lateral and normal potentials within said potential fields and transmission of representative signals in response to respective connection of said relay means, formation current shunting means in connection with said formation current means for selectively preventing any earth formation potential field, driving means in connection with said formation relay, said relay means and said shunting means for switching the formation relay means, respectively connecting the detection and transmission means during existence of the respective potential fields, and shunting the formation current during an interval sufficient for actuation of said relay means, and receiver and recorder and means in connection with said logging cable for providing indication of said lateral and normal signals.

12. In electrical logging apparatus of the type described, the combination of, a common current electrode and a lateral current electrode disposed in selectively spaced relation, a normal current electrode disposed in substantially remote relation from said common current electrode, at least one normal potential electrode and one lateral potential electrode respectively disposed in selectively spaced relation to said current electrodes, potential reference electrode means disposed in selectively spaced relation to said potential electrodes, formation current means in connection with said common current electrode and in alternate connection through a formation relay to said lateral current electrode and said normal current electrode for alternately providing a lateral and a normal potential field in surrounding earth formations in response to respective connection of said formation relay, a lateral potential detection and transmission means adapted for connection with a logging cable and in connection through a lateral relay to said lateral potential electrodes for detection of a lateral potential within said lateral potential field and transmission of a representative lateral signal in response to connection of said lateral relay, a normal potential detection and transmission means adapted for connection with said logging cable and in connection through a normal relay to said normal potential electrodes for detection of a normal potential within said normal potential field and transmission of a representative normal signal in response to connection of said normal relay, a formation current shunting means in connection with said formation current means for selectively preventing any earth formation potential field, and a relay driving means in connection with said formation relay, said lateral relay, said normal relay and said shunting means for switching the formation relay, connecting the lateral detection means during existence of the lateral potential field, connecting the normal detection means during existence of the normal potential field and shunting the formation current during an interval sufficient for actuation of said relays.

References Cited in the file of this patent
UNITED STATES PATENTS

| | | |
|---|---|---|
| 2,398,761 | Aiken | Apr. 23, 1946 |
| 2,436,563 | Frosch | Feb. 24, 1948 |
| 2,573,133 | Greer | Oct. 30, 1951 |
| 2,573,137 | Greer | Oct. 30, 1951 |
| 2,617,852 | Waters | Nov. 11, 1952 |